United States Patent [19]

Nutku

[11] 3,909,162
[45] Sept. 30, 1975

[54] TOROIDAL CHAMBER ROTATING PISTON MACHINE

[76] Inventor: Ata Nutku, Technical University I.T.U., Istanbul, Turkey

[22] Filed: Oct. 11, 1973

[21] Appl. No.: 405,675

Related U.S. Application Data

[62] Division of Ser. No. 94,815, Dec. 30, 1970, Pat. No. 3,798,897.

[52] U.S. Cl. .................. 418/34; 418/186; 418/187; 123/8.47
[51] Int. Cl.² .......................................... F04C 15/02
[58] Field of Search ....... 418/34, 36, 186, 187, 188; 123/8.47

[56] References Cited
UNITED STATES PATENTS

| | | | |
|---|---|---|---|
| 50,759 | 10/1865 | Westinghouse | 418/34 |
| 150,350 | 4/1874 | Palmer | 418/34 |
| 562,152 | 6/1896 | Prall, Jr. | 418/34 |
| 2,627,253 | 2/1953 | Lesher | 418/34 |
| 3,645,239 | 2/1972 | Cena | 418/36 |
| 3,798,897 | 3/1974 | Nutku | 418/34 |

*Primary Examiner*—C. J. Husar
*Attorney, Agent, or Firm*—Shapiro and Shapiro

[57] ABSTRACT

Engine (or pump) having a toroidal chamber defined by complementary chamber members, at least one of which is rotatable and each of which carries a piston projecting into the toroidal space and sweeping the surface of the other member. Both chamber members may have pistons which oscillate oppositely or which rotate intermittently in the same direction as "following pistons," the oscillatory or intermittent rotary movement being converted to continuous rotary movement of an output shaft. Central intake and exhaust passages are employed and different valve and "valveless" embodiments are disclosed. A closed cycle (reheating) engine is also disclosed.

35 Claims, 22 Drawing Figures

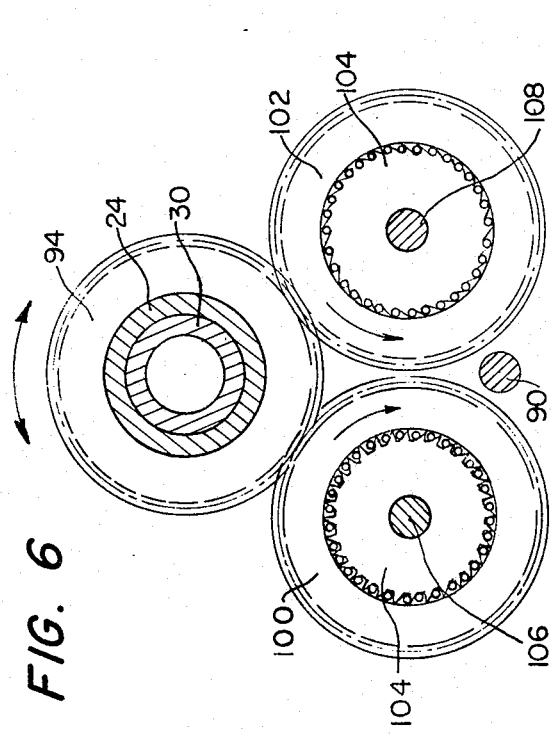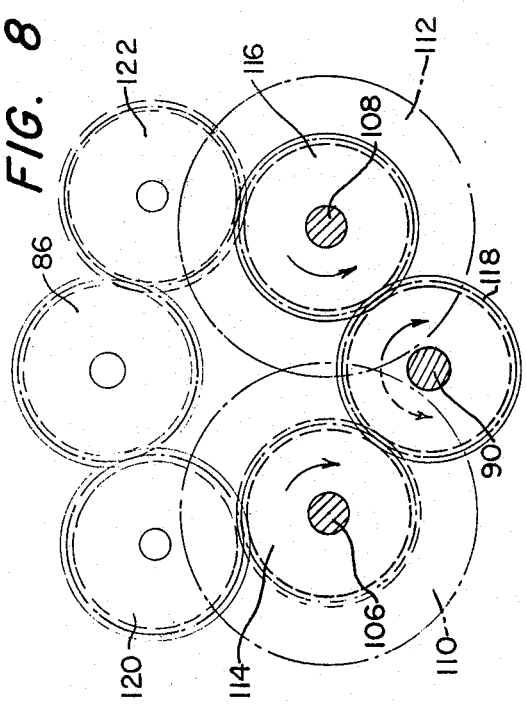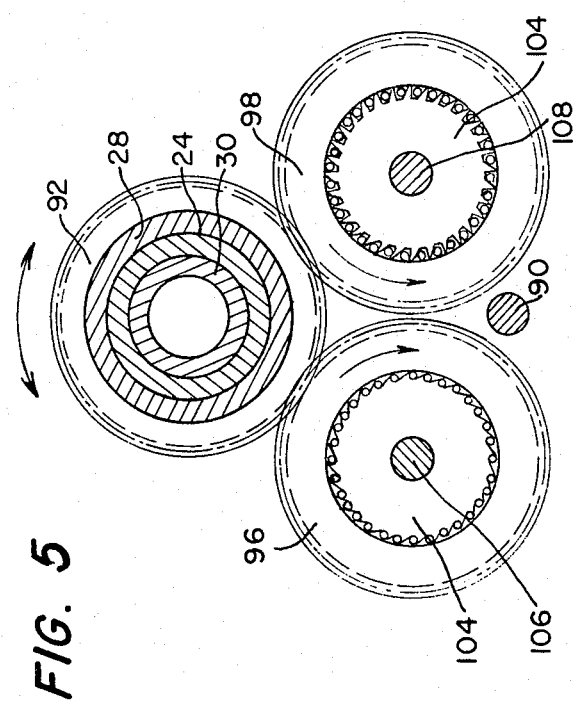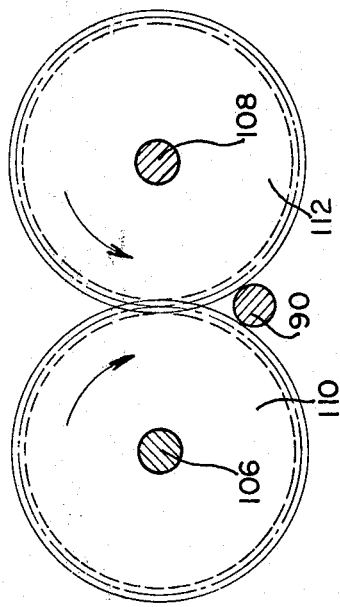

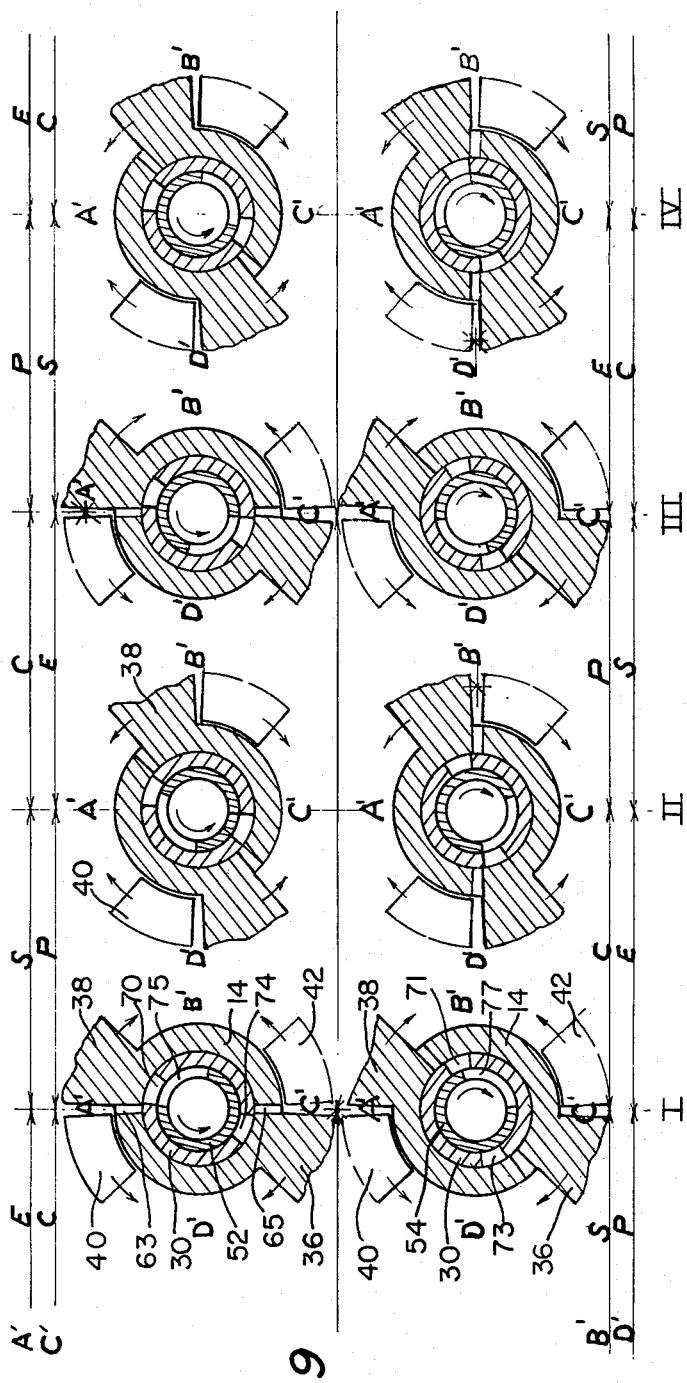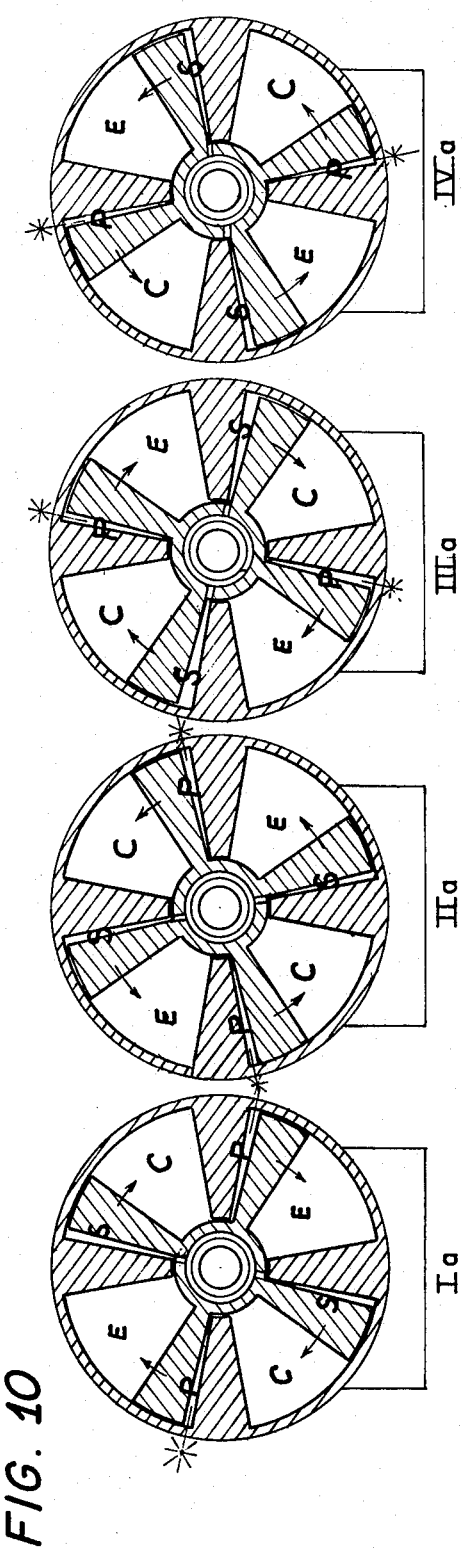
FIG. 9
FIG. 10

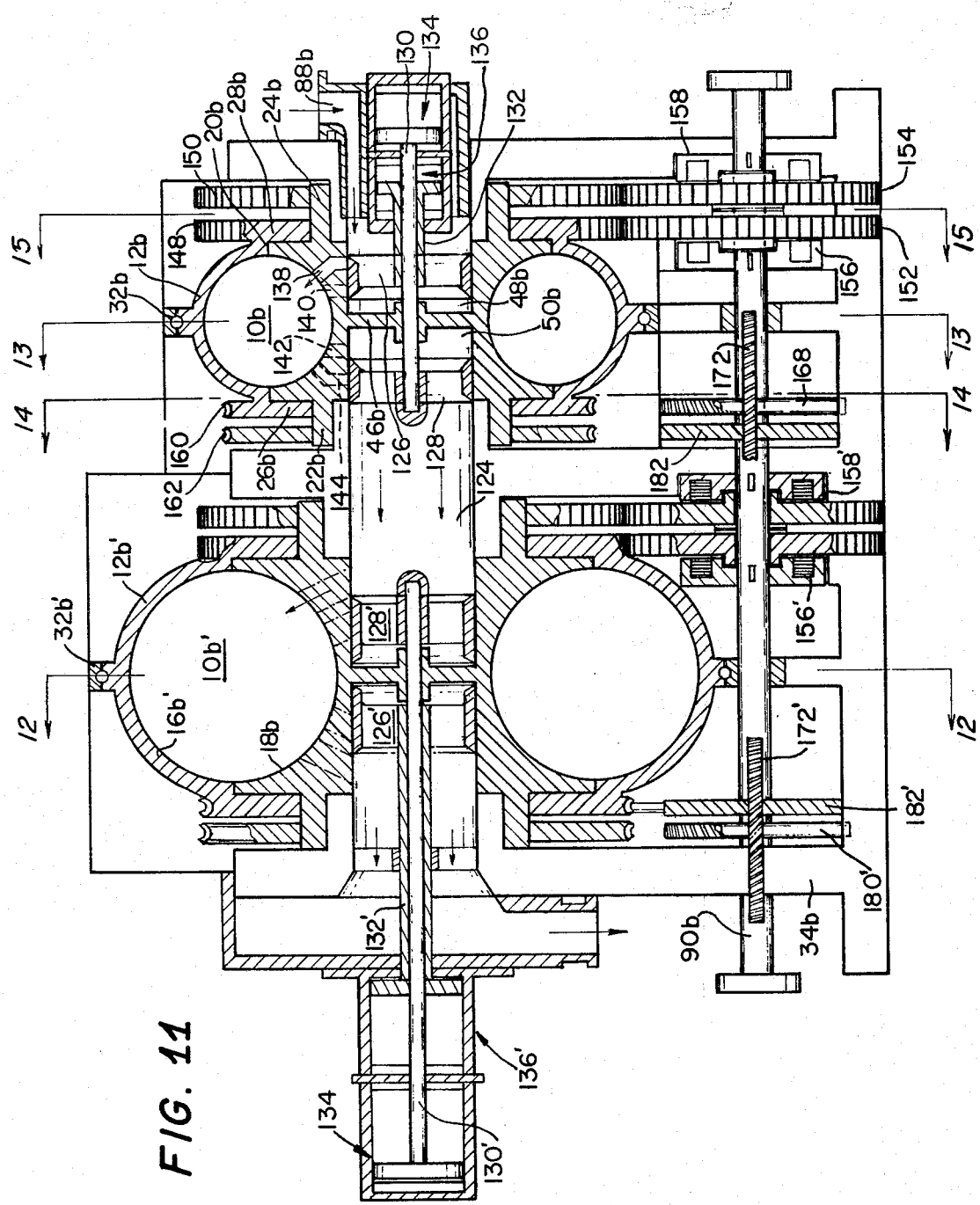

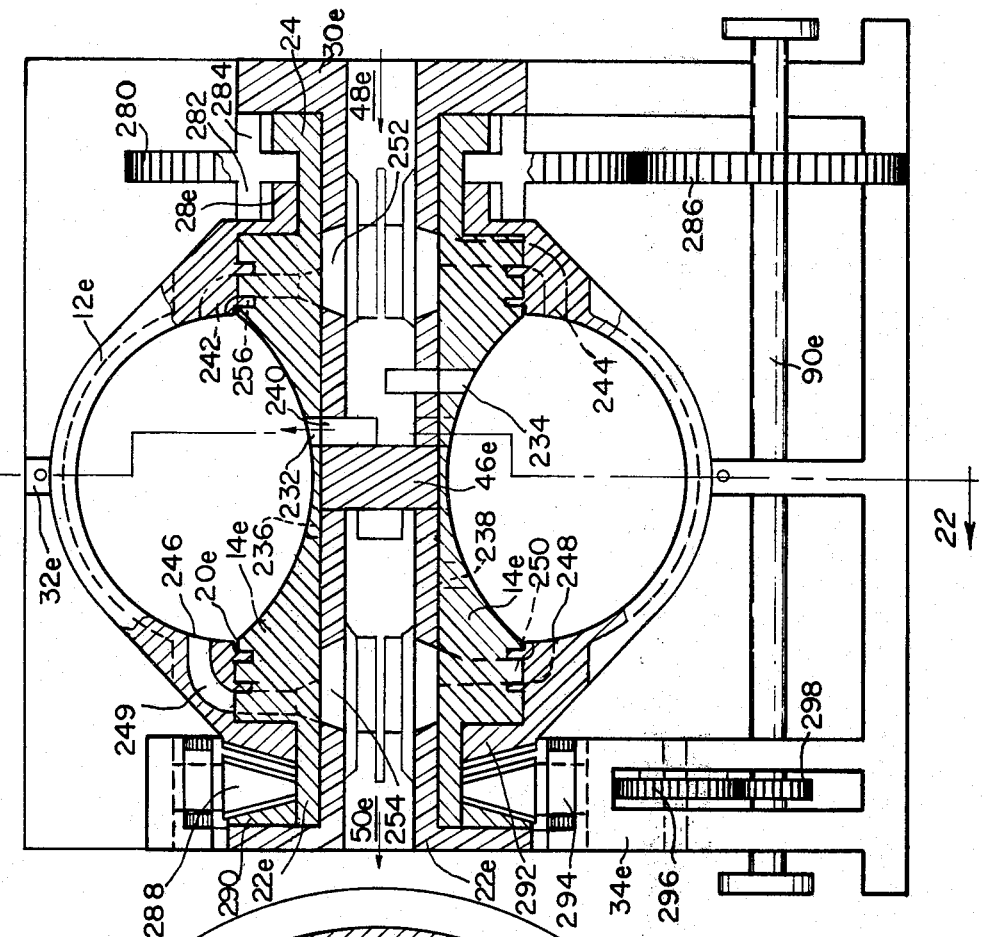
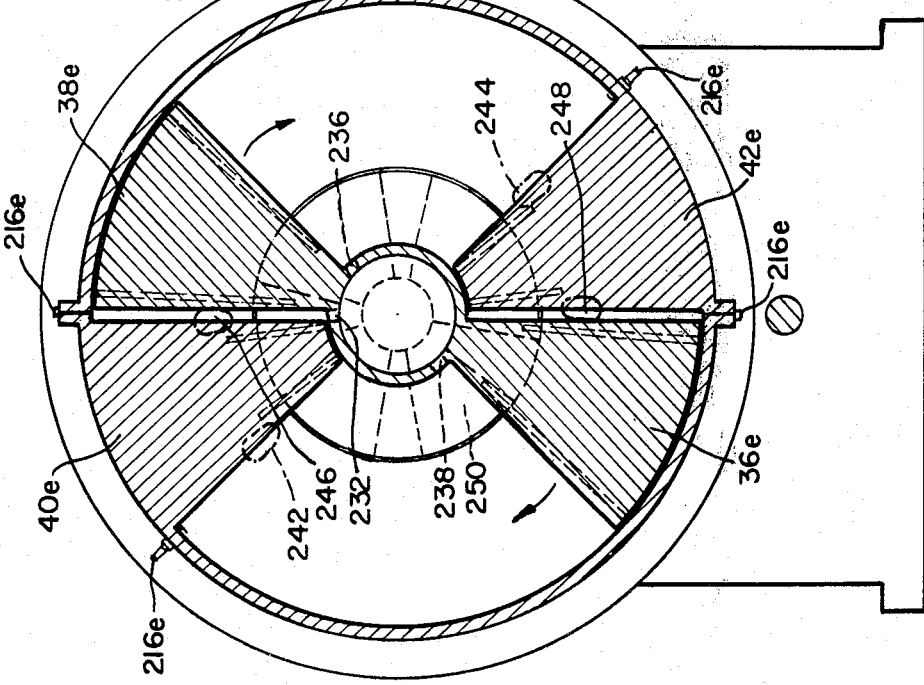

TOROIDAL CHAMBER ROTATING PISTON MACHINE

This is a division of application Ser. No. 94,815, filed Dec. 30, 1970, now U.S. Pat. No. 3,798,897.

BACKGROUND OF THE INVENTION

This invention relates to rotating or arcuately oscillating piston machines and is more particularly concerned with improvement of such machines and their rotors and pistons, intake and exhaust systems, and drive train.

The standard straight-cylinder reciprocating engine, as for example the steam engine or internal combustion engine, has a relatively short stroke in comparison to that of a rotary or arcuately oscillating engine, adversely affecting thermal and mechanical efficiencies. Moreover, the standard reciprocating engine has a high weight to power ratio, an overabudance of parts and high maintenance costs. In its internal combustion version pollution control is a difficult problem.

In existing rotating or arcuately oscillating piston engines, such as those employing rectangular stator or fluid chamber cross-section, the adoption of high pressure (which is the principal factor for the attainment of high compression ratios, high thermal efficiencies, and complete combustion of fuel to avoid pollution) cannot be realized. In the types employing an eccentric stator and non-circular shell configurations, uniform distribution and dissipation of heat and heat stresses cannot be attained. Those employing eccentric gearing suffer from poor mechanical efficiency. Complex and impractical arrangements are required for sealing and/or guiding oscillating or intermittently rotating pistons and for coupling the pistons to an output shaft. Intake and exhaust arrangements are inefficient and introduce further problems. In general, the poor performance and high wear which characterizes known rotating or arcuately oscillating piston engines have seriously limited their utilization in automotive and other applications.

BRIEF DESCRIPTION OF THE INVENTION

It is accordingly a principal object of the present invention to provide machines of the type employing rotating or arcuately oscillating pistons.

A further object of the invention is to provide improved machines of this type, capable of operation as a hot air, steam, or internal combustion engine, or as a hydraulic motor, pump, or compressor.

Another object of the invention is to provide machines of this type with improved sealing, fluid flow, valving, and transmission of power.

A further object of the invention is to provide an improved rotating or arcuately oscillating engine with a compression ratio of at least 25:1, which solves the problem of high-pressure fluid sealing, which incorporates uniflow streaming (non-reversal) of the working fluid, which is essentially non-polluting, and which avoids the complexities that characterize prior engines.

Yet another object of the invention is to provide a unique closed cycle engine which dispenses with a boiler and condenser.

Briefly stated, in accordance with a preferred embodiment, a machine of the invention comprises complementary chamber members defining therebetween a toroidal space or chamber. At least one of the members is mounted for turning movement about the axis of the chamber and carries a piston which projects into the chamber and sweeps a surface of the other member. Periodic communication is established between the chamber and central intake and exhaust passages. Oscillatory or intermittent rotary movement of the pistons is converted to continuous rotary movement of an output shaft.

BRIEF DESCRIPTION OF DRAWINGS

The invention will be further described in conjunction with the accompanying drawings, which illustrate preferred and exemplary embodiments, in which similar or corresponding parts are designated by the same reference characters modified by lower case letters and/or primes, and wherein:

FIGS. 5, 6, 7 and 8 are, respectively, transverse sectional views taken along lines 5—5, 6—6, 7—7, and 8—8 of FIG. 1;

FIGS. 9 and 10 are diagrammatic views illustrating the operation of engines in accordance with the invention;

FIG. 11 is a longitudinal sectional view of a further embodiment of the invention;

FIG. 21 is a longitudinal sectional view of yet another embodiment of the invention; and FIG. 22 is a transverse sectional view taken along line 22—22 of FIG. 21.

DETAILED DESCRIPTION OF THE INVENTION

Figure 1:
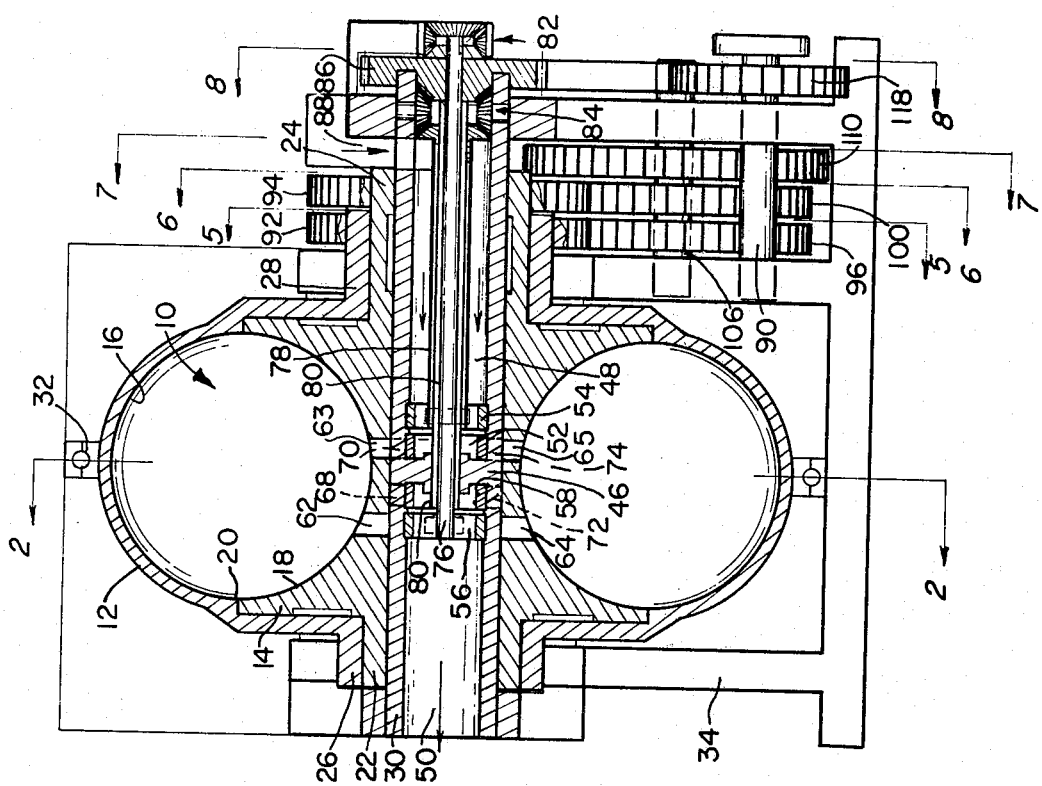
FIG. 1 is a longitudinal sectional view of an engine in accordance with the invention.
Figure 2:
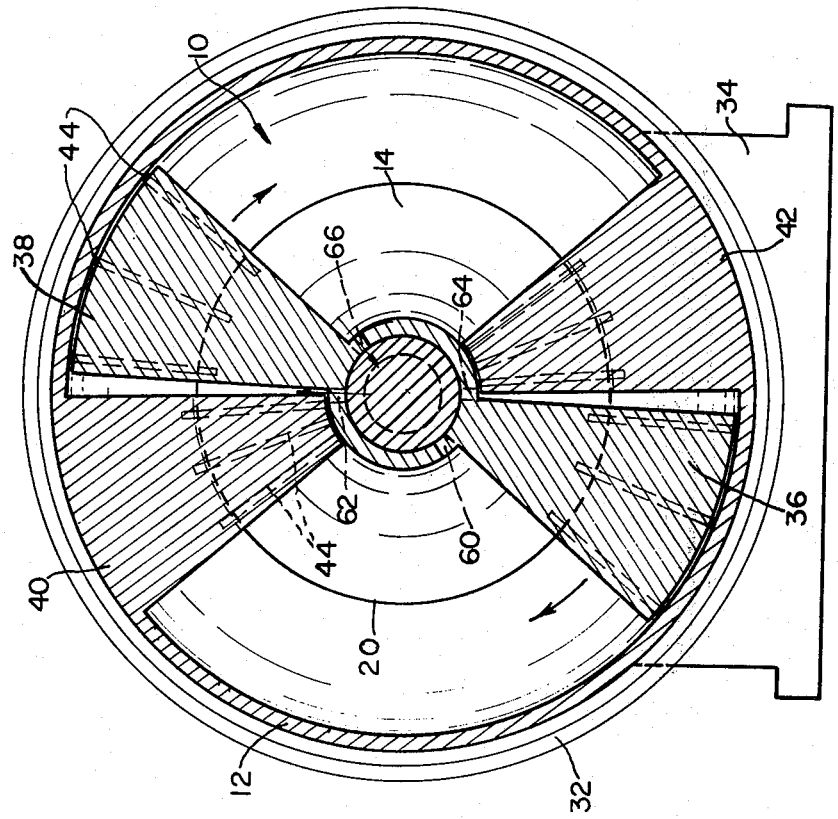
FIG. 2 is a transverse sectional view taken along line 2—2 of FIG. 1.

Referring to the drawings, and initially to FIGS. 1 and 2, a machine in accordance with the invention (described for explanatory purposes as an engine) comprises a toroidal chamber 10 defined by a rotary outer chamber member 12 and a rotary inner chamber member 14, the outer member having an inwardly concave surface 16 and the inner member having an outwardly concave surface 18, which, together, define the bounds of a toroidal space. The outer member is a shell and the inner member a "reel," both being rotors. The complementary surfaces of revolution 16 and 18 are preferably semi-circular in cross-section as shown in FIG. 1, and the cross-section of the toroidal chamber is preferably circular. The inner and outer chamber members are coaxial, one being provided with annular shoulders and the other with mating annular grooves, which interfit at 20 in a manner which permits relative rotation of the members while preserving a sealed relationship therebetween.

The inner member is provided with cylindrical extensions 22 and 24 at its opposite ends, and the outer member is provided with corresponding cylindrical extensions 26 and 28, which serve as trunnions. The inner member is mounted for rotation upon a central cylindrical tube 30, and the outer member is mounted for rotation upon the inner member. Peripheral bearings may be provided at 32, the entire assembly being supported upon a frame 34.

The embodiment of FIGs. 1 and 2 has four pistons and may be compared with an engine having four straight cylinders. The inner member has segmental pistons 36 and 38 projecting diametrically outwardly therefrom in opposite directions into the toroidal chamber, while the outer member has segmental pistons 40 and 42 projecting diametrically inwardly therefrom into the toroidal chamber at the opposite sides of the inner member. Each piston is generally ellipsoidal, preferably a sector of a sphere, pistons 36 and 38 having surfaces which mate with and sweep the inwardly concave surface 16 of the outer member, and pistons 40 and 42 having surfaces which mate with and sweep the outwardly concave surface 18 of the inner member. Semi-circular piston rings 44 are provided on the sweeping surfaces of the pistons to provide a seal with the mating surfaces of the chamber.

The central tube 30 serves as an intake and exhaust distributor tube, the tube being divided transversely by a partition 46 into an intake passage 48 and an exhaust passage 50. Communication between the intake and exhaust passages and the chamber 10 is provided periodically by rotary ring valves, valves 52 and 54 being intake valves, and valves 56 and 58 being exhaust valves. Ports such as 60–66 (see FIGS. 1, 2 and 9) are provided through the wall of the inner chamber member there being an intake port and an exhaust port spaced apart at each side of each piston of the inner member, as shown at 62, 63, and 64, 65. Peripherally elongated ports such as 68–74 are provided through the wall of the distributor tube 30, the ports of the distributor tube communicating with corresponding ports of the inner chamber member during a portion of the rotary movement of the latter. Each ring valve is provided with a port such as 75 or 77 (FIG. 9) which is peripherally elongated to an extent greater than the mating ports of the distributor tube, and each ring valve port controls a pair of distributor tube ports, such as 70, 74 or 71, 73 (FIG. 9), the circumferential positions of the distributor tube ports being chosen in accordance with the functions to be performed.

The ring valves are driven by coaxial shafts, valve 56 being driven by shaft 76, valve 54 by shaft 78, and valves 52 and 58 being driven by shaft 80, all of the valves being coupled to their shafts by conventional spiders. The valve shafts 76 and 78 are driven by suitable differential gearing 82 and 84, the input gear of each differential being fixed to a spur gear 86 rotatably supported at one end of tube 30, and the output of each differential (fixed to a valve shaft) being coupled to the input gear by the usual idlers, which are rotatably supported upon the frame 34. Shaft 80 is driven by gear 86. It will be observed that one intake valve and one exhaust valve are driven clockwise, while the others are driven counterclockwise, so that the valves are contrarotating. Fluid supplied to intake duct 88 is admitted to the toroidal chamber at the appropriate times and is exhausted by way of the exhaust passage 50.

In the operation of the machine of the invention as an engine, the inner and outer chamber members may oscillate in opposite directions, with the oscillatory movement of the chamber members being converted to continuous rotary movement of an output shaft 90. For this purpose an oscillatory-to-rotary transmission is provided, including the parts which will now be described. A gear 92 is fixed to the trunnion 28, and a gear 94 is fixed to the trunnion 24. As shown in FIGS. 5 and 6, gear 92 meshes with gears 96 and 98, while gear 94 meshes with gears 100 and 102. Each of gears 96, 98, 100, and 102 is provided with a one-way clutch or pawl-and-ratchet mechanism 104 which couples the movement of the associated gear to a corresponding shaft 106 or 108, gears 96 and 100 being coupled to the common shaft 106 and gears 98 and 102 being coupled to the common shaft 108. Each gear is coupled to its shaft for unidirectional movement only. By the arrangement of the one-way clutches or pawl-and-ratchet mechanisms, one chamber member drives one of the shafts 106 and 108 in one direction, while the other chamber member drives the other shaft in the opposite direction. Shafts 106 and 108 having meshing gears 110 and 112 fixed thereto, as shown in FIG. 7, are adapted to be coupled to further gears 114 and 116 by clutches (not shown). Gears 114 and 116 are coupled to shafts 106 and 108 alternately, depending upon the desired direction of rotation of the output shaft 90, and drive an output gear 118 fixed to the output shaft. Gears 114 and 116 also mesh with further gears 120 and 122, respectively, which mesh with the gear 86 previously described for driving the valves.

FIG. 9 shows diagrammatically the operation of the machine of FIGS. 1 and 2 as an internal combustion engine. For such application spark plugs may be mounted on the outer member at each side of the two pistons and energized through slip rings. The legends in the rows at the top and bottom of the Figure give the operations: suction (S), compression (C), power (P), and exhaust (E), for the different quadrants or compartments A', B', C' and D' of the toroidal chamber. The spark symbol represents ignition, which occurs in quadrant C' at position I, in quadrant B' at position II, in quadrant A' at position III, and in quadrant D' at position IV. The diagrams of FIG. 9 show the intake valves 52 and 54. The operation of the exhaust valves is similar.

Figure 3:
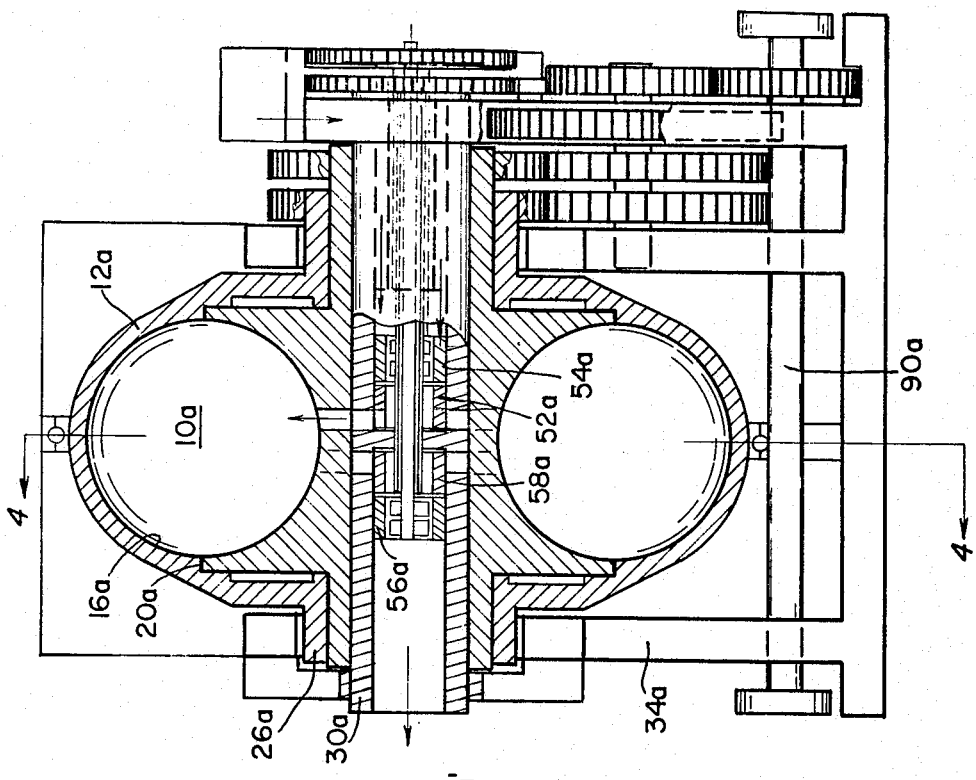
FIG. 3 is a longitudinal sectional view of a modified engine in accordance with the engine.
Figure 4:
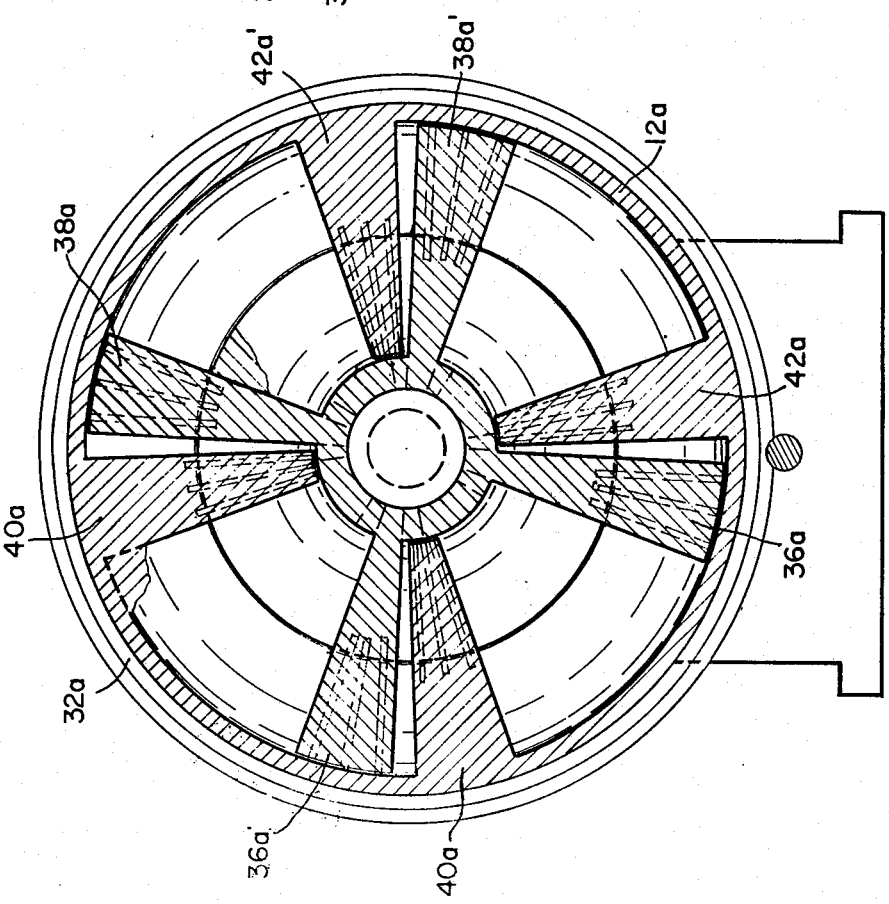
FIG. 4 is a transverse sectional view taken along line 4—4 of FIG. 3.

The embodiment of FIGS. 3 and 4 is similar to the embodiment of FIGS. 1 and 2, except that each of the chamber members is provided with four pistons, rather than two. This engine may be compared with an engine having eight straight cylinders. Each valve is elongated so that it may control extra ports for the extra compartments, and the engine has two ignitions and power strokes for every oscillation, rather than one. Spur gears are shown for the differentials instead of bevel gears.

In the embodiments described above, both the inner and outer chamber members oscillate relative to the fixed frame. It is also possible to have one member fixed, with the other member oscillating, a suitable transmission for converting the oscillatory movement of the single rotor to a continuous rotation of the output shaft being employed. FIG. 10 shows diagrammatically the apparatus of FIGS. 3 and 4, with the outer chamber member held fixed and the inner chamber member oscillating. Ignition occurs in two compartments at each of positions Ia–IVa.

The central admission and exhaust system of the invention facilitates uniflow (non-reversing) streaming of the working fluid and also facilitates the coupling of two or more engines in line independent of each other, the output shaft being extended in FIG. 3 to permit such coupling of multiple engines. The dead-center points of the engines may be staggered. Instead of mechanical pawl-and-ratchet mechanisms or one-way clutches, electro-magnetic couplings may be employed. Limiting stops may be placed on the trunnions to maintain clearance between the pistons.

A two-stage or compound high expansion engine of the invention is illustrated in FIG. 11. This embodiment includes a high pressure toroid followed by a low pressure toroid and employs "following" pistons and cylindrical slide valves instead of oscillating pistons and rotating valves. The two toroidal chambers 10b and 10b' are similar to the chambers previously described, including inner and outer toroidal members which define the toroidal chambers and which rotate relative to each other. The stages are arranged in line and are coupled to the same output shaft 90b. The compound engine may work with fluids such as steam, hot air, freon, etc. supplied at high pressure (for example, 1500 to 2000 pounds per square inch).

Figure 13:
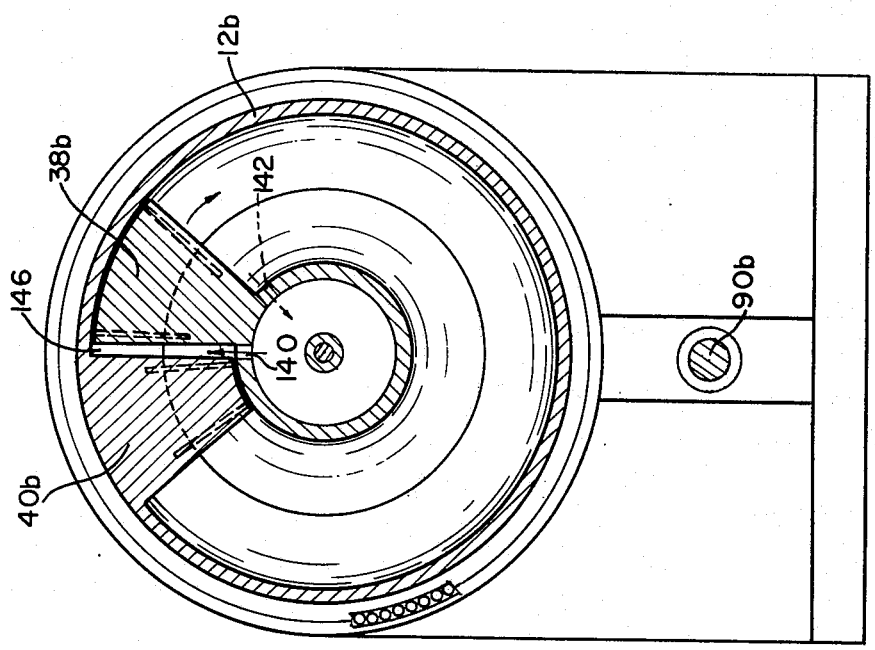
FIG. 13 is a transverse sectional view taken along line 13—13 of FIG. 11.
Figure 12:
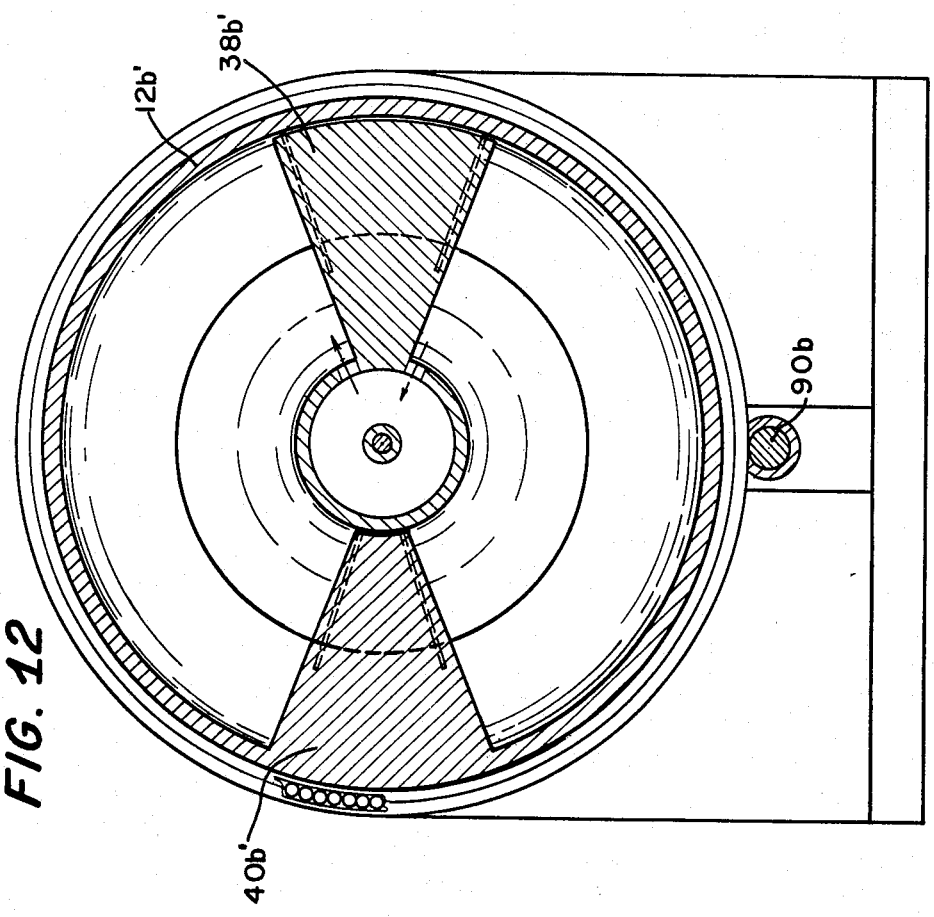
FIG. 12 is a transverse sectional view taken along line 12—12 of FIG. 11.

The pistons are illustrated in FIGS. 12 and 13, there being one piston for each chamber member or rotor, the pistons being shaped as previously described and provided with piston rings in the manner previously described. Each stage is designed so that an inner or outer piston rotates through 270° while the remaining piston is held stationary, and then the previously stationary piston is rotated through about 270° while the previously rotating piston is held stationary, the pistons rotating intermittently in the same directions and following each other. Since the construction of the two stages of the engine is essentially the same, a description of one stage will suffice for both.

The outer chamber member 12b is journaled at 26b and 28b over the trunnions 22b and 24b, respectively of the inner chamber member. The trunnions of the inner member support that member for rotation upon the frame 34b. The outer member is also rotatably supported upon the inner member by the annular run 20b and by the peripheral bearing member 32b.

The inner chamber member has a central bore divided by a transverse partition 46b into an intake passage 48b and an exhaust passage 50b. The exhaust passage of the first stage is coupled to a bore 124 through the frame 34b which joins the exhaust passage of the first stage to the intake passage of the second stage. A cylindrical intake valve is provided at 126 and an exhaust valve at 128. The valves are of the sliding type and are operated by shafts 130 and 132 coupled at one end to the valves and at the other end to actuators 134 and 136, which may be electromagnetic actuators of the push-pull type, for example.

The live fluid is introduced through inlet 88b and through the intake passage 48b. The intake valve 126 slides in one direction or the other to uncover intake port 138 or 140 at opposite sides of the piston of the inner chamber member. The working fluid exhausts from the toroidal chamber 106 through one of ports 142 and 144 at opposite sides of the said piston (but displaced laterally from the intake ports).

As will be seen more fully hereinafter, one of the pistons is free to rotate, and the fluid admitted between the trailing side of that piston and the leading side of the stationary piston causes the free piston to rotate (see FIG. 12 or FIG. 13), the exhaust gases between the leading face of the free piston and the trailing face of the stationary piston being pushed out thorugh the exhaust port into the exhaust passage. Exhaust fluid from the high pressure stage drives the low pressure stage in the same manner. When the free piston approaches the trailing face of the stationary piston, leaving a clearance 146 as shown in FIG. 13 (which may be determined by stops on the journals or trunnions), the free piston will become stationary, and the stationary piston will become free to rotate, the working fluid again being admitted and exhausted in the manner previously described.

The intermittent rotary movement of the pistons is transmitted to the output shaft 90b by a gear train, including a gear 148 fixed to the outer chamber member, a gear 150 fixed to the journal 24b of the inner chamber member, and gears 152 and 154 meshing with gears 148 and 150, respectively, and freely rotatable on the output shaft 90b. Gears 152 and 154 are coupled to the output shaft by electromagnetic clutches 156 and 158, respectively, having parts fixed for rotation with the output shaft and cooperating parts fixed to the gears 152 and 154.

Figure 14:
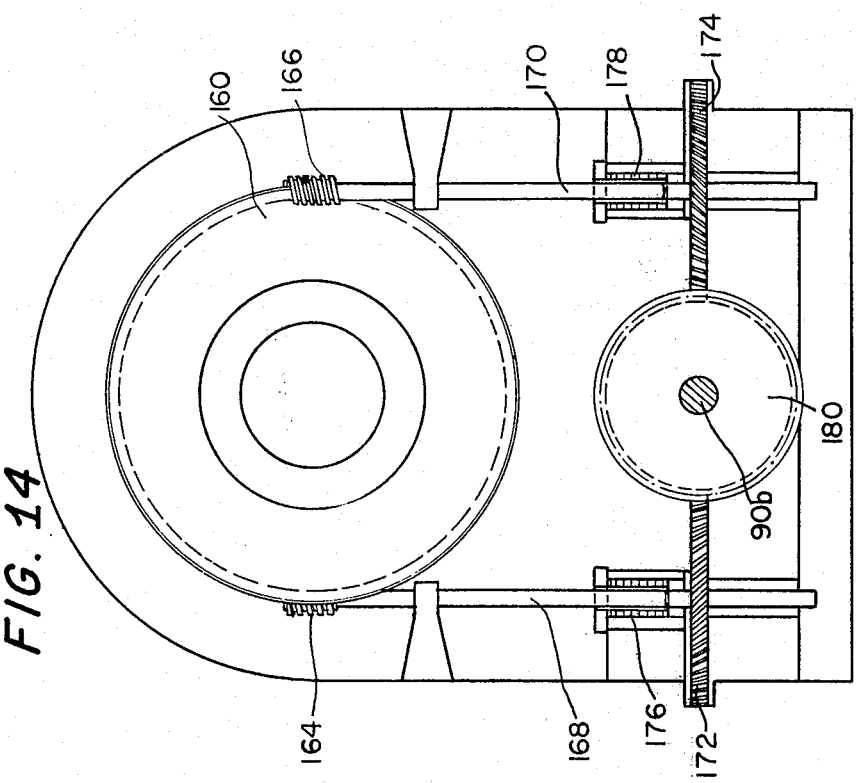
FIG. 14 is a transverse sectional view taken along line 14—14 of FIG. 11.
Figure 15:
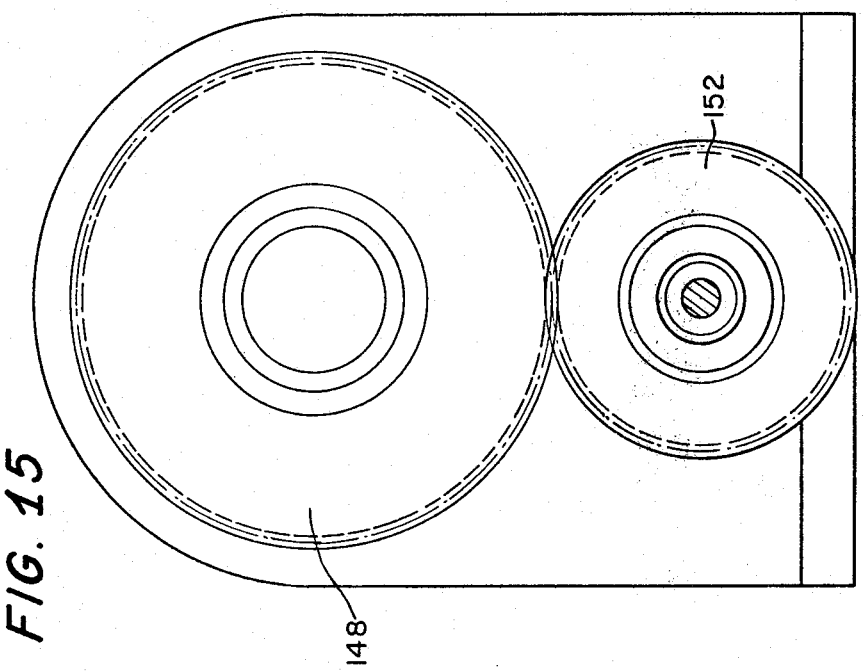
FIG. 15 is a transverse sectional view taken along line 15—15 of FIG. 11.

For holding the inner and outer chamber members stationary, alternately, the outer member has a worm wheel 160 fixed thereto and the inner member has a worm wheel 162 fixed thereto at the ends of these rotors opposite to the gear train. As shown in FIG. 14, worm gears 164 and 166 fixed to the ends of shafts 168 and 170, respectively, mesh with the worm wheels 160 and 162, respectively. If a worm gear is driven by its shaft 168 or 170, so as to drive the worm wheel 160 or 162 synchronously with the associated chamber member, then that chamber member is free to rotate. If, however, a worm gear is not driven, the associated worm wheel and chamber member cannot rotate. Shafts 168 and 170 are coupled to helical gears 172 and 174, respectively, by electromagnetic couplings 176 and 178, respectively. Gears 172 and 174 mesh with helical gears 180 and 182, respectively, which are fixed to the output shaft 90b. Thus, when it is desired that a chamber member be free to rotate, the associated coupling 176 or 178 is energized and the associated worm gear 164 or 166 is rotated. Conversely, when a chamber member is to be held stationary, the associated coupling 176 or 178 is de-energized. Operation of the electromagnetic couplings for engaging the gears with the output shaft and for holding the rotors stationary may be controlled by properly synchronized switches of a control center (not shown).

Figure 16:
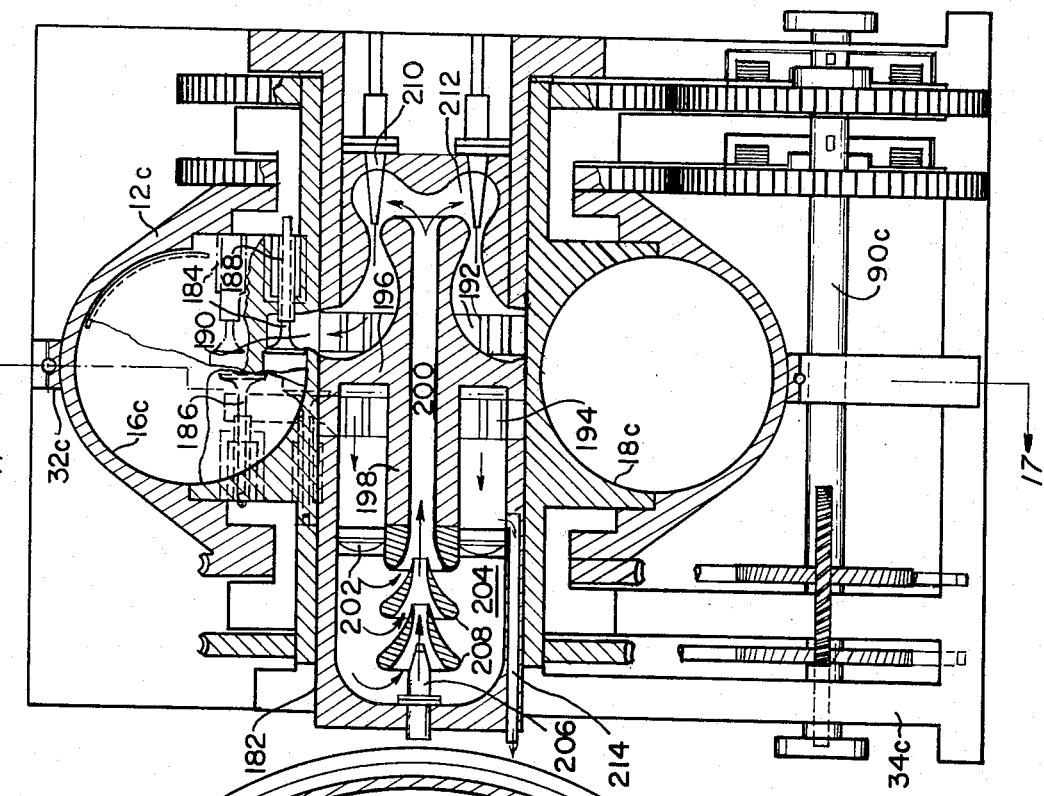
FIG. 16 is a longitudinal sectional view of a further embodiment of the invention.
Figure 17:
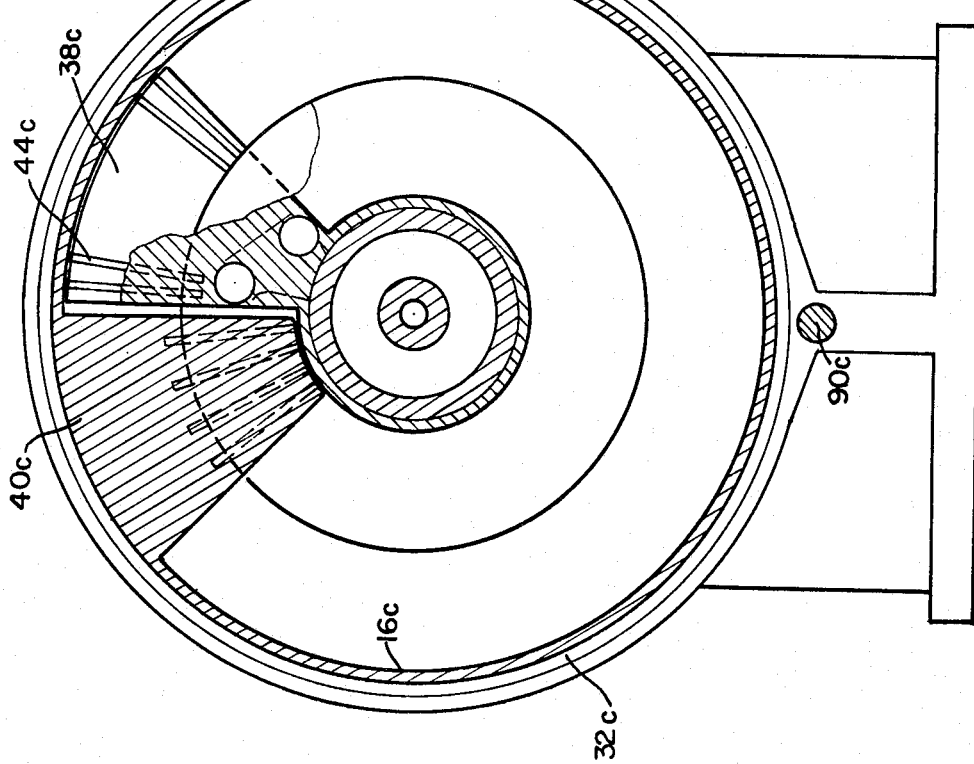
FIG. 17 is a transverse sectional view taken along line 17—17 of FIG. 16.

FIGS. 16 and 17 illustrate a closed-cycle following pistons rotary engine embodiment of the invention. This embodiment employs inner and outer rotors defining a toroidal chamber in the same manner as the previous embodiments, the inner rotor being rotatable upon a central tube 182 fixed to the frame 34c, and the outer rotor being rotatable upon the inner rotor. Pistons 38c and 40c of the type previously described divide the toroidal chamber into two pressure-tight compartments. Working fluid is admitted to these compartments and exhausted therefrom by electromagnetically actuated poppet valves insulated from and embedded in the piston 38c of the inner rotor. Valves 184 are intake valves, and valves 186 are exhaust valves. The valves are operated by their electromagnetic actuators, such as solenoids 188, which may be connected to a synchronously switched electric power supply by means of slip rings, for example. The arrangements for coupling the rotors to the output shaft 90c alternately and for holding the rotors stationary alternately may be identical to those described in connection with the embodiment of FIG. 11.

There are two intake valves and two exhasut valves embedded in the inner piston 38c. The intake valves control the opening and closing of ports at the opposite faces, respectively, of the inner piston 38c, and the exhaust valves similarly control the opening and closing of ports at the opposite faces of piston 38c. The intake ports are at the end of branch passages merging with a common intake passage which commences at a circumferential opening 190 at the base of the inner piston and which mates with a circumferential series of slits 192 through the wall of tube 182. Similarly, the exhaust ports are at the end of branch passages merging with a common exhaust passage which commences at a further circumferential opening at the base of the inner piston and which mates with a series of slits 194 through the wall of tube 182 at the opposite side of a transverse partition 196. Partition 196 is integral with an inner tube 198 extending coaxially with tube 182 and having a central passage 200. Inner tube 198 is substantially shorter than the outer tube 182 and substantially smaller in diameter to provide spaces or chambers surrounding opposite ends of the inner tube. The ends of outer tube 182 are closed.

Gases exhausting from the toroidal chamber 10c through the slits 194 pass through one-way valves 202 into a receiver or ejector chamber 204, having a torch or nozzle 206, such as an oxyacetelene or hydrogen torch or a super-heated steam nozzle, for reheating of the working fluid. The hot gas from the nozzle or torch 206 directed into the inlet of passage 200 causes the exhaust gas to be sucked through venturis 208 into the inlet of passage 200. The exhaust gases are reheated by the nozzle or torch 206 and by additional nozzles or torches 210 mounted in corresponding fluid chamber 212 at the outlet of passage 200, the reheated gases being ejected by the torches or nozzles into the intake opening 190 at the base of the inner piston 38c. Tube 214 (with a one-way valve) serves to drain condensed excess fluid. The engine operates without a boiler or condenser.

Figure 18:
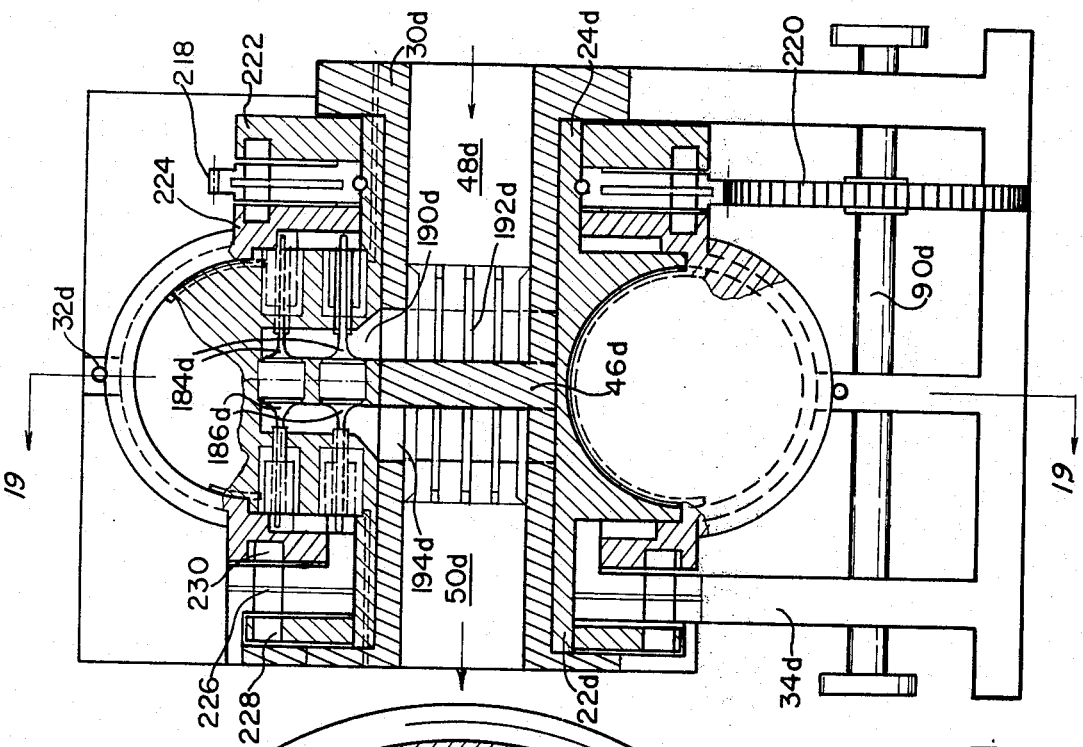
FIG. 18 is a longitudinal sectional view of a further embodiment of the invention.
Figure 19:
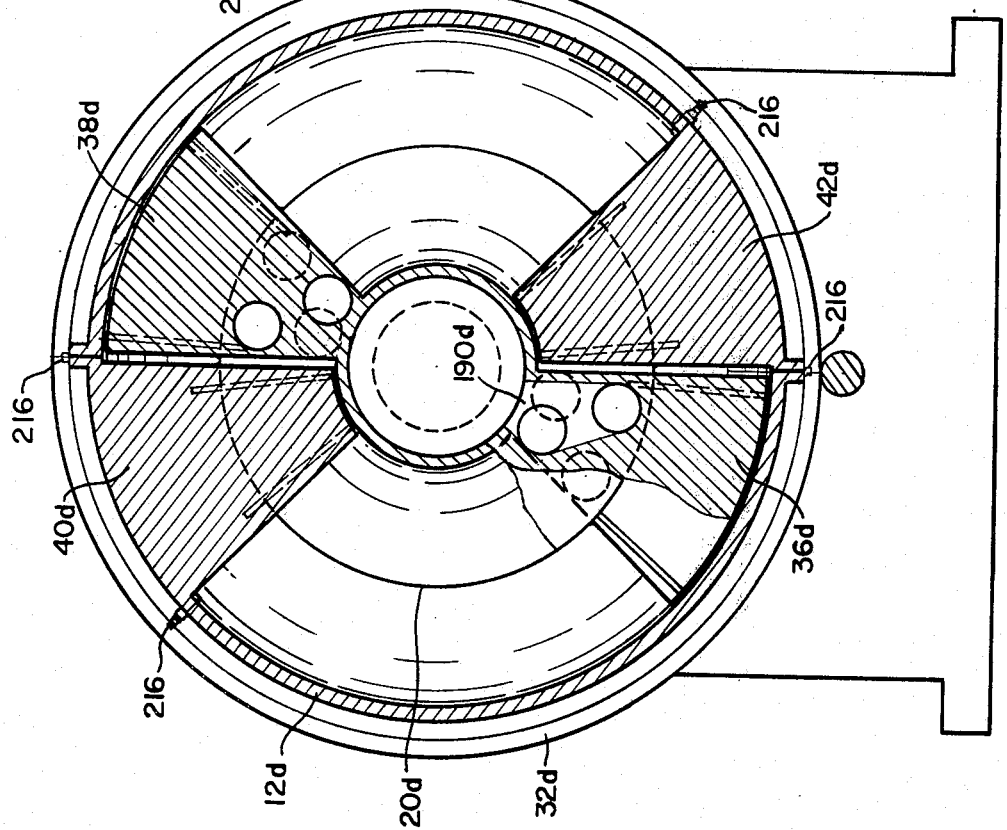
FIG. 19 is a transverse sectional view taken along line 19—19 of FIG. 18.

FIGS. 18 and 19 illustrate a further embodiment of a following pistons engine in accordance with the invention. This embodiment is shown as an internal combustion engine, although it will be apparent that the structure is not limited to such application. As in embodiments previously described, the engine employs inner and outer rotors which constitute a toroidal chamber, the trunnions 22d and 24d of the inner rotor being rotatably supported upon a fixed central tube 30d, the outer rotor being supported upon the inner rotor. A transverse partition 46d divides the tube 30d into an intake passage 48d and an exhaust passage 50d.

Vaporized fuel from a carburetor (not shown) is supplied to the intake passage 48d and passes through a circumferential series of slits 192d in the wall of the tube 30d to an intake opening 190d at the base of each inner piston. The intake opening leads to a pair of intake valves 184d embedded in the associated piston, these valves controlling communication with intake ports at oppoiste faces of the piston. Similarly, each inner piston has exhasut valves 186d embedded therein and controlling communication between exhaust ports at the opposite sides of the piston and an exhaust opening at the base of the piston which communicates with a circumferential series of slits 194d through the wall of tube 30d at the corresponding side of partition 46d. The valves may be electromagnetically controlled poppet valves as described previously. Each intake valve is opposed with an exhaust valve, these valves providing communication with the same opening in the piston face, but alternately. Spark plugs 216 may be provided as shown in FIG. 19 mounted upon the outer rotor and energized by means of slip rings (not shown).

The power transmission in this embodiment employs an electromagnetic coupling including a gear wheel 218 freely rotatable upon the trunnion 24d and meshing with a gear 220 fixed to the output shaft 90d, and a pair of driving members 222 and 224 fixed to the inner and outer rotors, respectively. The driving members and gear wheel 218 are provided with the usual cooperating poles, the gear wheel being coupled to one or the other of the driving members, depending upon which one is energized (by means of slip rings, for example).

For holding the rotors stationary, alternately, another electromagnetic coupling (a brake) is provided at the opposite end of the rotors. This coupling includes a member 226 fixed to the frame 34d and members 228 and 230 fixed to the rotors, respectively. The usual cooperating poles are provided, and one or the other of the members 228 and 230 is energized to hold that member fixed to member 226. Thus one rotor is held fixed while the other is driven and coupled to the output shaft, and vice versa.

Figure 20:
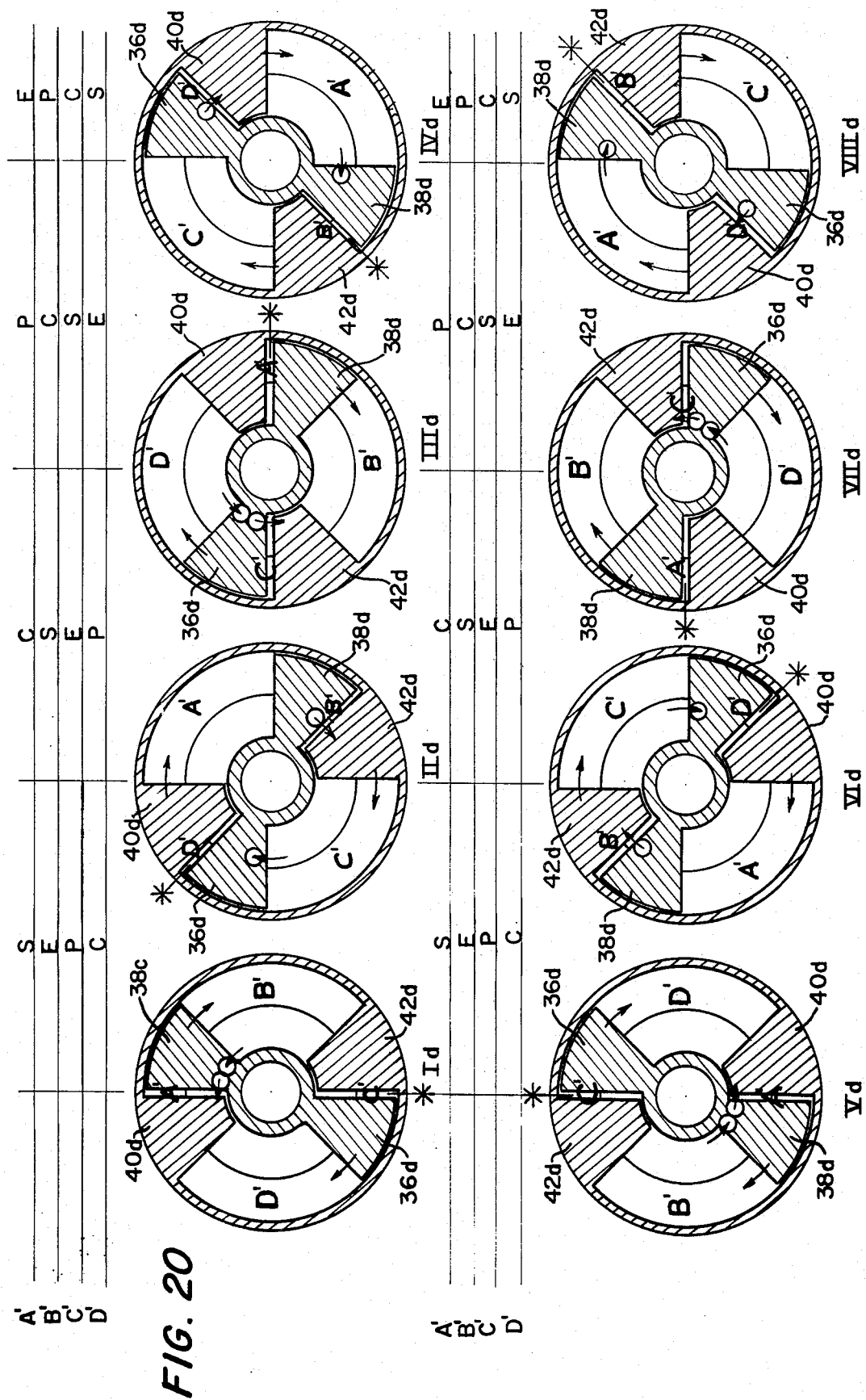
FIG. 20 is a diagrammatic view illustrating the operation of an engine of the invention.

FIG. 20 illustrates the operation of the engine of FIGS. 18 and 19, the symbols for the toroidal compartments and the operations being the same as those employed in conjunction with FIGS. 9 and 10. Eight strokes are required to bring the pistons back to their original starting positions. Ignition at every stroke gives eight power strokes during that period. The compression ratio may be about 30 to 1, and the engine will produce very little pollution. Each stroke is about 90°, and the ends of the storke may be limited by stops on the trunnions to preserve clearance between the pistons. The number and size of the pistons and the number of strokes can be varied as required. The upper lines of legends in FIG. 20 give the operations within the designated compartments shown in the upper row of diagrams with respect to positions Id–IVd, and the lower rows of legends give similar information with respect to the lower row of diagrams at positions Vd – VIIId.

The embodiment of FIGS. 21 and 22 is a "valveless" machine shown as an internal combustion engine. Again, there is an inner and outer rotor, and in this instance the cross-section of the toroidal chamber is oval, but it can be circular. A fixed inner tube 30e rotatably supports the inner rotor 14e by means of the journals 22e and 24e at opposite ends of the inner rotor. The outer rotor is rotatably supported upon the inner rotor. An intake port 232 or 234 is provided through the inner rotor at the trailing face of each piston 38e and 36e. Exhaust ports 236 and 238 are provided at the opposite sides of pistons 38e and 36e. These ports cooperate with corresponding circumferentially elongated slots, such as 240, through the wall of the distributor tube 30e. The circumferential position and length of the slots 240 are selected in accordance with their purpose, so that when the outer rotor is stationary, and the inner rotor turns relative to the distributor 30e through about 90°, an intake passage will be open at the trailing face of each pistons 36e and 38e, and an exhaust passage will be open at the leading face of each of these pistons, the intake and exhaust passages being opened just after the inner rotor commences to turn and being closed just before the inner rotor stops turning.

Similarly, the outer rotor is provided with inlet ports 242 and 244 at the trailing face of each of the pistons 40e and 40e and exhaust ports 246 and 248 at the leading face of each of pistons 40e and 42e. Ports 242–248 are located at one end of corresponding passages, such as 249 in the outer rotor, the other end of which is located at the junction 20e of the inner and outer rotors. At this junction the inner rotor is provided with a series of circumferential slots such as 250, the circumferential length and position of these slots being chosen in accordance with their purpose. Each slot 250 communicates with the corresponding passage 249 of the outer rotor through slightly less than 90 degrees of rotation of the outer rotor relative to the inner one, so that the inlet passages and the exhaust passages of the outer rotor open just after the outer rotor commences to rotate and close just before the outer rotor ceases to rotate. A circumferential series of slits 252 or 254 is provided at each end of the distributor tube 30 e for continual communication with the circumferential slots 250 at the junction 20e. Annular collars 256 of the outer rotor fit in annular grooves of the inner rotor to isolate the slots and ports at the junction 20e and to prevent lateral movement of the outer rotor.

For the transmission of power from the rotors to the output shaft 90e a gear wheel 280 is mounted for free rotation within an annular trough defined between a flange at the end of trunnion 24e and the end of trunnion 28e. The gear wheel 280 has cylindrical extensions 282 and 284 at opposite sides thereof, and between the inner surfaces of these extensions and the outer surfaces of the adjacent trunnions of the outer and inner rotors, respectively, one-way clutches, such as pawl-and-ratchet mechanisms, are provided. One clutch slips while the other is engaged, whereby gear wheel 280 is driven alternately in the same direction by the inner and outer rotors and drives gear 286 fixed to the output shaft 90e.

The rotor-holding mechanism at the opposite end of the rotors comprises a tapered annular ring 288, the sides of which are provided with teeth engageable with corresponding teeth of annular members 290 and 292 fixed to the inner and outer rotors, respectively. Member 288 is free to slide axially upon the trunnion 22e of the inner rotor but is splined to the frame 34e to prevent rotation. An electromagnetic coupling 294 has members at opposite sides of member 288 fixed to the rotors, respectively, and which, when energized, attract member 288 and cause it to slide in one axial direction or the other, thereby to engage one of members 290 and 292 and to hold the associated rotor fixed. Timing of the energization of the respective sides of the electromagnetic coupling 294 may be controlled by gears 296 and 298 driven from the output shaft 90e.

While preferred embodiments of the invention have been shown and described, it will be apparent to those skilled in the art that changes can be made in these embodiments without departing from the principles and spirit of the invention, the scope of which is defined in the appended claims. For example, features of the different embodiments, such as chamber shape, number of pistons, number of stages, power transmission, rotor-holding mechanism, intake and exhaust system, and valving arrangements, may be interchanged where appropriate. Different working fluids may be employed, and the machines may be employed as engines of different type or as pumps where appropriate. Accordingly, the foregoing embodiments are to be considered illustrative, rather than restrictive of the invention, and those modifications which come within the meaning and range of equivalents of the claims are to be included therein.

The invention claimed is:

1. Apparatus of the type described, comprising a pair of complementary inner and outer chamber members of smoothly curved arcuate cross-section defining a toroidal chamber therebetween of circular or oval cross-section, said outer member being unitary and substantially continuously inwardly concave relative to the axis of said chamber and said inner member being unitary and substantially continuously outwardly concave relative to said axis, mounting means for supporting the chamber members, at least one of said members being supported for turning movement with respect to said mounting means about said axis of said toroidal chamber and having a piston rigidly fixed thereto and projecting therefrom into said chamber with a surface arranged to sweep a mating surface of the other member.

2. Apparatus in accordance with claim 1, wherein said piston is sectoral.

3. Apparatus in accordance with claim 1, wherein the other of said members has a piston rigidly fixed thereto and projecting therefrom into said space with a surface thereof arranged to sweep a mating surface of said one member, and wherein both of said members are supported for turning movement with respect to said mounting means about said axis.

4. Apparatus in accordance with claim 1, wherein a tube extends centrally of the toroidal chamber, said apparatus further comprising means for establishing communication between said tube and said chamber.

5. Apparatus in accordance with claim 1, further comprising means defining intake and exhaust passages centrally of said chamber, and means for establishing communication between said passages and said chamber at opposite sides of said piston.

6. Apparatus in accordance with claim 5, said inner member being mounted for turning movement, said passage-defining means comprising a fixed tube extending centrally of said chamber along said axis and having a transverse partition dividing said tube into said intake passage and said exhaust passage, said communication-establishing means comprising mating ports in said tube and said inner member.

7. Apparatus in accordance with claim 5, both said members being mounted for turning movement, said communication-establishing means comprising mating ports in said tube and said inner member and mating ports in that member and the other member connecting with passages through the latter.

8. Apparatus in accordance with claim 5, said inner member being mounted for turning movement, said passage-defining means comprising a central bore in said inner member divided by a transverse partition of said inner member, said communication-establishing means comprising passages leading from said bore to said chamber and cylindrical valve means coaxial with said chamber and movable in said bore for opening and closing the last-mentioned passages.

9. Apparatus in accordance with claim 8, said valve means comprising sliding ring valves.

10. Apparatus in accordance with claim 5, said inner member being mounted for turning movement, said passage-defining means comprising a fixed tube extending centrally of said chamber along said axis and divided by a transverse partition, said communication-establishing means comprising mating ports in said tube and said inner member and valve means embedded within the last-mentioned member.

11. Apparatus in accordance with claim 10, wherein said valve means comprises poppet valves.

12. Apparatus in accordance with claim 10, wherein said valves are electrically actuated.

13. Apparatus in accordance with claim 1, the other of said members also having a piston rigidly fixed thereto and projecting therefrom into said chamber with a surface arranged to sweep a mating surface of said one member.

14. Apparatus in accordance with claim 13, further comprising means for oscillating said pistons in opposite directions.

15. Apparatus in accordance with claim 14, further comprising an output shaft, and means for converting the oscillatory movement of said pistons to rotary movement of said output shaft.

16. Apparatus in accordance with claim 15, further comprising means defining intake and exhaust passages centrally of said chamber, rotary valve means for periodically providing communication between said passages and said chamber, and means for driving said valve means synchronously with said output shaft.

17. Apparatus in accordance with claim 13, further comprising means for rotating said pistons alternately in the same direction.

18. Apparatus in accordance with claim 17, further comprising an output shaft, and means for converting the alternate rotary movement of said pistons to continuous rotary movement of said output shaft.

19. Apparatus in accordance with claim 18, said movement-converting means comprising one-way couplings driven alternately by said members.

20. Apparatus in accordance with claim 18, wherein said movement-converting means comprises means for coupling said members to said output shaft alternately.

21. Apparatus in accordance with claim 18, further comprising means for holding said members stationary alternately.

22. Apparatus in accordance with claim 21, said holding means comprising a worm wheel fixed to each of said members and a worm gear meshing with each worm wheel, respectively, and having means for driving the same synchronously with said output shaft and means for decoupling the same from said output shaft.

23. Apparatus in accordance with claim 22, said decoupling means comprising a clutch and said driving means comprising a gear train.

24. Apparatus in accordance with claim 21, said holding means comprising an electromagnetic coupling.

25. Apparatus of the type described, comprising a pair of complementary inner and outer chamber members of smoothly, curved arcuate cross-section defining a toroidal chamber therebetween, said outer member being unitary and substantially continuously inwardly concave relative to the axis of said chamber and said inner member being unitary, and substantially continuously outwardly concave relative to said axis, means for mounting each of said members for turning movement about the axis of said chamber, each of said members having a piston projecting therefrom into said chamber toward the other member with each piston being provided with a surface arranged to sweep a mating surface of the other member, means defining intake and exhaust passages, and means for providing communication between said passages and said chamber at opposite sides of said pistons.

26. Apparatus in accordance with claim 25, further comprising means for causing said members to rotate alternately in the same direction, an output shaft, and means for converting the alternate rotary movement of said members to continuous rotary movement of said output shaft.

27. Apparatus in accordance with claim 25, wherein each of said members has a semicircular cross-section and each of said pistons has a circular cross-section and is provided with rings sweeping the mating surface of the other member.

28. Apparatus in accordance with claim 25, wherein said means defining intake and exhaust passages comprises a tube extending along the axis of said chamber and wherein said means providing communication comprises cooperating ports in the inner member and in said passages for periodically establishing communication between said passages and said chamber at opposite sides of the piston of the inner member and cooperating ports in the outer member and the inner member for periodically establishing communication between said passages and opposite sides of the piston of the outer member.

29. Apparatus in accordance with claim 25, said passage-defining means comprising a tube extending centrally of said chamber along the axis thereof, there being mating ports in said tube and said inner member.

30. Apparatus in accordance with claim 25, said passage-defining means comprising a tube extending centrally of said chamber and having a transverse partition separating said intake and exhaust passages.

31. Apparatus in accordance with claim 30, said communication-providing means comprising sliding valve means at opposite sides of said partition, and means for driving said valve means synchronously with the movement of said members.

32. Apparatus in accordance with claim 30, said communication-providing means comprising valve means at opposite sides of said partition, and means for driving said valve means synchronously with the movement of said members.

33. Apparatus in accordance with claim 32, further comprising means for causing said members to oscillate oppositely, an output shaft, and means for converting the oscillatory movement to rotary movement of said output shaft.

34. Apparatus in accordance with claim 33, said valve means comprising contra-rotating ring valves having ports in their periphery adapted to communicate with ports in the periphery of said tube.

35. Apparatus in accordance with claim 34, said movement-converting means comprising a gear train, said valves having shafts extending co-axially with said tube and coupled to said gear train.

* * * * *